United States Patent Office 2,835,644
Patented May 20, 1958

2,835,644

POLYISOBUTYLENE-PETROLEUM RESIN COMPOSITIONS

Joseph F. Nelson, Westfield, and John F. McKay, Cranford, N. J., assignors to Esso Research and Engineering Company, a corporation of Delaware No Drawing. Application June 8, 1954
Serial No. 435,354

3 Claims. (Cl. 260—45.5)

The present invention relates to films prepared from polyisobutylene containing various amounts of hydrogenated petroleum resins prepared from steam-cracked petroleum fractions.

It is known how to prepare high molecular weight products by the polymerization of isobutylene in the presence of Friedel-Crafts catalysts such as boron trifluoride, aluminum chloride or aluminum bromide at temperatures from 0° C. to —115° C. Products having molecular weights of about 100,000 to 250,000 by the Staudinger method can be prepared in this manner. However, these products are tough and nervy and consequently cannot be satisfactorily formed into films, i. e., they are not processible. Many materials have been tried to improve processibility, with surprisingly little or no success.

It has now been found that soft, flexible, strong films can be readily made from polyisobutylene by incorporating therein various amounts of hydrogenated petroleum resins from steam-cracked petroleum fractions. In contrast to many additives which have been found to be incompatible, the hydrogenated resins of this invention are compatible with polyisobutylene.

It has been difficult to find a suitable material to incorporate in high molecular weight polyisobutylene. What is needed is a compatible organic compound that is a plasticizer without rendering the polyisobutylene too soft for practical purposes, that is it must impart processibility to the polyisobutylene without destroying its highly desirable tough flexible properties.

Peculiarly the hydrogenated resins of this invention are admirably suited for this purpose. The blend is tough and flexible, and the films prepared therefrom show a very high degree of recovery after being stretched. In addition the low unsaturation of the hydrogenated petroleum resins makes such compounds resistant to aging degradation due to oxidation. The films do not develop the bad odors and tastes characteristic of unhydrogenated resins.

Hydrocarbon resins can be produced from certain unsaturated petroleum refinery streams containing mixtures of olefins and diolefins by such methods as polymerization using Friedel-Crafts catalysts. The steam-cracked distillates have been found especially useful for this purpose.

Such distillates are prepared by cracking petroleum fractions such as kerosene, gas oil, naphtha, petrolatum or residues in the presence of 50 to 90 mole percent steam at temperatures of about 540° C. to 870° C. The desirable portion of the cracked products has a boiling range between 20° and about 280° C., or it may be composed of any intermediate fraction. A typical stream shows 20% diolefins, 51% olefins, 27% aromatics and 2% paraffins and naphthenes. As an example of a desirable cut, the material boiling largely below $C_9$ is segregated and preferably heated at about 90 to 140° C. to dimerize most of the cyclopentadienes. After the dimerization, a $C_8$ to $C_9$ and lighter liquid cut including $C_5$ is taken overhead and there is separated a dimer concentrate as bottoms. This overhead stream may, if desired, be topped to about 38° C. to remove the isoprene containing fraction. The stream obtained boiling up to about 140° C., or selected portions thereof, is used as the basic polymerization feed.

The hydrocarbon resin processes to which the present invention is applicable are carried out by treating a hydrocarbon mixture containing diolefins, olefins, aromatics, paraffins, and naphthenes with about 0.25 to 3.% based on the unsaturated hydrocarbon feed, of a Friedel-Crafts type catalyst such as aluminum chloride, aluminum bromide, or boron trifluoride. The catalysts may be used as solids (gas in the case of $BF_3$) or they may be employed as solutions, slurries or complexes. Hydrocarbon complexes of the catalysts, obtained by reaction of the aluminum or boron halide with the resin polymerizate from the reactor or a resin raffinate containing about 60% olefins and 40% aromatics, are also quite useful. In the case of hydrocarbon feeds boiling in the range of about 20 to 140° C., $AlCl_3$ or $AlBr_3$ is the preferred catalyst, whereas $BF_3$ may also be used in the case of feeds boiling between about 50 and 270° C.

The typical hydrocarbon fractions boiling from 20° C. to about 140 or even 170° C. have the following composition and are useful for feeds in making these resins.

|  | Wt. Percent | Fraction, ° C. |
|---|---|---|
| Distillation Range | 0-60 | 20-70 |
|  | 65-40 | 70-130 |
|  | 35-0 | 130-170 |
| Composition: |  |  |
| Diolefins | 10-25 |  |
| Aromatics | 20-50 |  |
| Olefins | 66-24 |  |
| Paraffins | 4-1 |  |

The polymerization reactions are conducted at temperatures in the range of —30 to +100° C., and preferably from —15° to +70° C. In carrying out the polymerizations, either batch or continuous operations may be employed. The reaction is carried out in one or more stages. The resin formed may be recovered by water and/or alkali washing to remove catalyst followed by stripping off the unpolymerized material and low molecular weight oil by vacuum or steam distillation. One good way to remove the halide catalyst is to add methyl alcohol to form a solid complex, which is then filtered off. The resin stripping is carried to 250°–260° C. still bottoms temperature at atmospheric pressure. To remove the liquid polymer ($C_{10}+$ polymer), stripping is continued with superheated steam or at 3–5 mm. Hg pressure to a maximum bottoms temperature of 260–270° C.

The whole operation of removing unpolymerized material may also be done under slight vacuum with the aid of steam.

The resin may also be prepared by polymerizing a steam-cracked feed having a boiling range of about 30° C. to about 280° C. Such a feed contains olefins, and it is rich in diolefins and unsaturated aromatics. Polymerization is effected at —30 to about 100° C. with $AlCl_3$, $AlBr_3$ or $BF_3$. The unsaturated aromatics, diolefins, and some of the olefins, especially the tertiary olefins polymerize to form the resin. The saturated aromatics and the less reactive olefins of the secondary and primary types, as well as the oily polymers are removed by stripping as described above. The resins obtained possess somewhat higher melting points than those obtained from lower boiling feeds and they are quite suitable for use in this invention.

The resins thus obtained are subjected to hydrogenation,

This may be carried out either on the resin solution directly as it comes from the polymerization step, although it may be washed or otherwise treated to remove the residual catalyst or, if desired and is preferred, the polymer resin is recovered by stripping off the unreacted materials and volatile oily polymers. This stripping can be aided with steam or reduced pressures or with a combination of these. If the resin is recovered from the volatile constituents, it may be either melted and hydrogenated as such, or it may be redissolved in a suitable solvent, preferably a hydro-inert solvent such as hexane or paraffinic hydrocarbon fraction of somewhat similar boiling range, to reduce hydrogen consumption. The concentration of such solution may vary from about 10 to 70 weight percent by weight of resin for the hydrogenation step, or even up to 100% resin, meaning that the melted resin may be hydrogenated per se.

The hydrogenation is then effected under a pressure of about 100–5000 p. s. i. g., preferably about 500–4000 p. s. i. g., and at temperatures of 38–400° C., preferably about 150–260° C. for a few minutes up to 40 hours or more, but preferably about 1 to 30 hours, in the presence of a suitable hydrogenation catalyst such as nickel, reduced nickel, nickel sulfide, copper chromite, cobalt molybdate, molybdenum sulfide, or various catalysts supported on light porous or granular particles of large surface area such as $MoS_2$ on charcoal. The hydrogenation may be carried out batchwise or continuously. The amount of catalyst in a batch operation should generally be about 5 to 50 percent by weight based on the amount of resin being subjected to hydrogenation. If continuous hydrogenation is used, the feed rate of resin solution through the catalyst bed should be about 0.05 to 5, preferably about 0.15 to 1.0, v./v./hr., i. e. volumes liquid feed per volume of catalyst per hour. The extent of hydrogenation may be determined by either the pressure drop caused by hydrogen consumption, the amount of hydrogen consumed, or by periodic examination on samples of the resin solution during the course of hydrogenation.

When the hydrogenation has been completed or carried to the desired low iodine number, the resin solution may be either stored and shipped as such or may be subjected to stripping under low pressure, e. g. steam stripping or vacuum stripping, to remove the volatile solvents as well as any other low molecular weight substances present. It is important, however, that this hydrogenation process be effected under conditions sufficiently stringent only to form a substantially water-white color in the resin, but without any substantial reduction in softening point in the resin or any other substantial degradation thereof.

The resulting hydrogenated resin has a Gardner color, in the 100% solids state, of 5 or less, and preferably less than two, and most preferably it is water-white, whereas the unhydrogenated resin has a Gardner color of 12 or more. The iodine number (ASTM) generally is less than 100 and may range substantially down to zero, although it is important to note that a very surprising feature is that a water-white resin may be obtained without reducing the iodine number much below 100.

The isobutylene polymers used in this invention are materials ranging in molecular weight from about 100,000 to 250,000 Staudinger and are obtained by polymerizing isobutylene at temperatures below 0° C. preferably from −40° to −115° C. with a halide catalyst such as boron trifluoride, aluminum chloride, aluminum bromide, titanium tetrachloride or zirconium tetrachloride. The molecular weight of the polymer is controlled by the purity of the isobutylene, the catalyst and the temperature of the polymerization. The higher molecular weight polymers are obtained at very low temperatures and with very pure isobutylene. Solvents such as hexane, pentane and the like, or methyl chloride and the like, may be mixed with the isobutylene prior to polymerization.

The hydrogenated resin and the polyisobutylene are mixed in proportions of 71.5 wt. percent to 87 wt. percent of polysiobutylene having a molecular weight of 100,000 to 250,000 Staudinger and 28.5 wt. percent to 13 wt. percent of a hydrogenated petroleum resin.

The following examples illustrate how the present invention can be applied but are not to be construed as limiting the invention.

*Example I*

A steam cracked naphtha stream having the following boiling range and composition:

Boiling range—30–280° C.
About 15 wt. percent diolefins
About 22 wt. percent aromatics
About 62 wt. percent olefins
About 1 wt. percent paraffins and naphthenes was polymerized with 1 wt. percent $AlCl_3$ catalyst.

The $AlCl_3$ catalyst was added to the feed as an anhydrous powder over a period of 30 minutes with vigorous agitation and occasional cooling to maintain the temperature at approximately 25±5° C. After catalyst addition, the reaction mixture was allowed to age an additional 30 minutes, at the end of which time it was quenched and washed with an acid solution followed by another wash with aqueous sodium carbonate solution. The washed polymerizate was then stripped using a one-plate distillation to 250° C. bottoms temperature. The raffinate was rejected and the polymer was further stripped to 250° C. at 3 mm. Hg pressure. The resulting resin had a softening point of 100–115° C., a Gardner color of 17 (50% solution in toluene) and an iodine number of 168.

*Example II*

A steam-cracked naphtha stream having the following boiling range and composition:

Boiling range—27–125° C.
Composition:
    About 20% diolefins
    About 31% aromatics
    About 48% olefins
    About 1% paraffins and naphthenes was continuously polymerized with 1 wt. percent $AlCl_3$ catalyst.

The $AlCl_3$ catalyst was added to the reactor pump-around system as an anhydrous powder and the reactor contents were agitated and cooled to maintain the temperature at approximately 40° C. Fresh feed was continuously added at suitable rates to maintain reactor levels. After 1 hour residence time, a hydrocarbon-catalyst mixture stream from the reactor was quenched with acidic water. It was then washed with water containing a wetting agent, soda ash solution and again with water. After settling, the washed polymerizate was stripped with steam at a bottoms temperature of 250° C. The resulting resin had a softening point of 99° C., a Gardner color of 12 (50% solution in toluene) and an iodine number of 170.

*Example III*

Two hundred thirty grams of the resin produced in Example I was dissolved in about 500 cc. heptane and hydrogenated in a rocking bomb, using an excess (about 200 grams) of Raney nickel catalyst. The hydrogenation was conducted for 38 hours at 200–215° C. at 3200 p. s. i. g. hydrogen pressure. After filtering off the catalyst, the heptane was stripped off under vacuum. The resulting resin had a softening point of 110° C., an iodine number of 26 and a Gardner color of less than 1 (almost water-white).

*Example IV*

550 grams of the resin produced in Example II was dissolved in 1000 cc. heptane and hydrogenated over 55 grams of nickel on kieselguhr catalyst (10 wt. percent based on resin). The hydrogenation was conducted in a rocking bomb for 30 hours at 260° C. at 3900 p. s. i. g. hydrogen pressure. After filtering off the catalyst, the heptane was stripped off under vacuum. The resulting resin had a softening point of 97° C., a Gardner color of 3 (50% solution in toluene) and an iodine number of 36.

Example V

A 25 wt. percent solution of the resin produced in Example II was made in mineral spirits and the resin solution continuously hydrogenated by passing it through a bed of activated nickel on kieselguhr catalyst. Residence time of the resin solution in the reactor was four hours, i. e. 0.25 v./v./hr. at 204° C., 3000 p. s. i. g., hydrogen pressure and 5000 cubic ft. of hydrogen per barrel of feed  The resulting resin, when stripped of solvent, was water-white and had a softening point of 99° C.

Example VI

The hydrogenated resin obtained in Example IV was compounded on a rubber mill at 160° C. with a high molecular weight polyisobutylene according to the following recipe:

| | Parts |
|---|---|
| Polyisobutylene (200,000 mol. wt.) | 100 |
| Hydrogenated resin | 25 |
| Micro wax (170° F. M. P.) | 2 |
| Stearic acid | 0.5 |
| Deenax (2,6 di-tertiary butyl para cresol) | 0.25 |

The composition was then formed into thin sheets on a calendering mill keeping the top roll at 104° C. and the middle roll at 102° C. Smooth, tough films of excellent appearance were produced in this manner.

The foregoing description does not by any means cover the possible uses of this invention nor the forms which it may assume, but serves to illustrate its fundamental principles. It is obvious that changes in the details may be made without departing from either its novel characteristics or the spirit and scope of the invention. For example, in the formulations given above zinc stearate may be replaced with magnesium, aluminum or calcium stearate or palmitate or the magnesium, aluminum or calcium salts of any of the $C_{12}$ to $C_{22}$ aliphatic fatty acids.

Other changes may also be made in these formulations as would occur to one skilled in the art without departing from the spirit of this invention.

The nature and objects of the present invention having been thus fully set forth and specific examples of the same given, what is claimed as new and useful and desired to be secured by Letters Patent is:

1. A composition of matter having excellent film-forming characteristics comprising a mixture of 71.5 wt. percent to 87 wt. percent of polyisobutylene having a molecular weight of 100,000 to 250,000 Staudinger and 28.5 wt. percent to 13 wt. percent of a hydrogenated petroleum resin, said resin being prepared by catalytically polymerizing a feed stock boiling between 20° and 280° C. and having the following composition:

| | Percent |
|---|---|
| Diolefins | 10–25 |
| Aromatic hydrocarbons | 20–50 |
| Olefins | 66–24 |
| Paraffins | 4– 1 | and hydrogenating the resin formed.

2. A composition of matter having excellent film-forming characteristics comprising 80% by wt. of polyisobutylene having a molecular weight of 200,000 and 20% by wt. of a hydrogenated petroleum resin prepared by catalytically polymerizing a feed stock boiling at 30–280° C. and containing about 15 wt. percent diolefins, 22% aromatic hydrocarbons, 62% olefins and 1% paraffins and naphthenes and hydrogenating the resin formed.

3. A composition of matter having excellent film-forming characteristics comprising 80% by wt. of polyisobutylene having a molecular weight of 200,000, and 20% by wt. of a hydrogenated petroleum resin prepared by catalytically polymerizing a feed stock boiling at 27–125° C. and containing about 20 wt. percent diolefins, 31% aromatic hydrocarbons, 48% olefins, and 1% paraffins and naphthenes and hydrogenating the resin formed.

References Cited in the file of this patent

UNITED STATES PATENTS

| | | |
|---|---|---|
| 2,213,423 | Wiezevich | Sept. 3, 1940 |
| 2,302,664 | Carmody | Nov. 24, 1942 |
| 2,339,958 | Sparks | Jan. 25, 1944 |